United States Patent
Ryu (10) Patent No.: US 9,692,527 B2
(45) Date of Patent: Jun. 27, 2017

(54) APPARATUS AND METHOD FOR INTERFERENCE SIGNAL CANCELLATION OF CENTRAL STATION

(71) Applicant: Electronics and Telecommunications Research Institute, Daejeon (KR)

(72) Inventor: Joon Gyu Ryu, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

(21) Appl. No.: 15/260,964

(22) Filed: Sep. 9, 2016

(65) Prior Publication Data

US 2017/0141855 A1    May 18, 2017

(30) Foreign Application Priority Data

Nov. 18, 2015  (KR) .................. 10-2015-0161929

(51) Int. Cl.
  *H04B 1/10*   (2006.01)
  *H04B 15/00*  (2006.01)
  *H04W 84/06*  (2009.01)
  *H04L 7/00*   (2006.01)

(52) U.S. Cl.
  CPC ............ *H04B 15/00* (2013.01); *H04L 7/0008* (2013.01); *H04W 84/06* (2013.01)

(58) Field of Classification Search
  CPC ......... H04B 1/10; H04B 15/00; H04L 7/0008; H04W 84/06
  See application file for complete search history.

(56) References Cited

U.S. PATENT DOCUMENTS

| 6,859,641 | B2  |   2/2005 | Collins et al. |              |
|-----------|-----|----------|----------------|--------------|
| 2008/0064432 | A1* | 3/2008 | Park           | H04B 1/126   |
|              |     |        |                | 455/522      |
| 2009/0154609 | A1  | 6/2009 | Kim et al.     |              |
| 2012/0099521 | A1  | 4/2012 | Ryu et al.     |              |
| 2013/0208655 | A1* | 8/2013 | Jiang          | H04H 20/67   |
|              |     |        |                | 370/317      |

* cited by examiner

*Primary Examiner* — Nguyen Vo
(74) *Attorney, Agent, or Firm* — William Park & Associates Ltd.

(57) ABSTRACT

Provided is an apparatus for an interference signal cancellation of a central station. The apparatus includes: a communication unit; a storage unit configured to store a transmission signal of the central station received via the communication unit; and a signal processor configured to extract first time synchronization information (NCR) of a current time and second time synchronization information (NCR) included in an overlapping signal and calculate a difference value between the two time synchronization information, when the overlapping signal which is an overlapped signal of a terminal station is received on the same channel as a channel of the transmission signal of the central station, and to extract the transmission signal of the central station stored in a previous time in the storage unit based on the difference value and remove an interference signal included in the overlapping signal.

11 Claims, 6 Drawing Sheets

APPARATUS AND METHOD FOR INTERFERENCE SIGNAL CANCELLATION OF CENTRAL STATION

CROSS-REFERENCE TO RELATED APPLICATION

This application claims the benefit of priority to Korean Patent Application No. 10-2015-0161929, filed on Nov. 18, 2015, in the Korean Intellectual Property Office, the disclosure of which is incorporated herein in its entirety by reference.

BACKGROUND OF THE INVENTION

Field of the Invention

The present disclosure relates to an apparatus and a method for an interference signal cancellation of a central station.

Description of the Related Art

A two-way satellite communications system via a satellite uses a Time Division Multiplexing (TDM) based Digital Video Broadcasting-Satellite (DVB-S) method as a forward link, and uses a Time Division Multiple Access (TDMA) based Digital Video Broadcasting-Return Channel via Satellite (DVB-RCS) method as a reverse link.

This two-way satellite communication system transmits periodically reference time information, generated by a 27 MHz clock which is a reference clock of a central station, which is included in a Moving Picture Expert Group-2 Transport Stream (MPEG2-TS) having a specific Program ID (PID) in order to restore a clock of a receiving side. The receiver restores the 27 MHz clock which is a reference clock of a central station by using the transmitted reference time information, and uses it as a reference clock of the receiving side.

The two-way satellite communication system based on the DVB-RCS standard configuring a reverse link through a satellite maintains a clock and timing synchronization of the reverse link by using the reference clock of the receiving side.

However, when receiving a signal through the same channel as a transmission signal of the central station, since the reception signal includes a transmission signal of the central station as well as a signal of a terminal station, a process of removing an interference signal is required in order to obtain an accurate reception signal.

To this end, the central station is able to obtain and remove an initial synchronization of the transmission signal, but there is a problem in that it takes a lot of time in order to obtain an initial synchronization to meet an initial starting point.

SUMMARY OF THE INVENTION

The present disclosure has been made in view of the above problems, and provides an apparatus and a method for an interference signal cancellation of a central station which receives an overlapped signal via the same channel as a transmission signal when using a DVB-S2 method as a forward link and using a TDMA-based DVB-RCS method as a reverse link, and simply and quickly identify an initial synchronization point of time of the transmission signal through a Network Clock Reference (NCR) value inserted into a frame of signal to quickly remove the transmission signal from the overlapped signal.

In accordance with an aspect of the present disclosure, an apparatus for an interference signal cancellation of a central station includes: a communication unit configured to transmit and receive a signal to and from a central station; a storage unit configured to store a received transmission signal of the central station when a transmission signal of the central station transmitted from the central station to a satellite is received via the communication unit; and a signal processor configured to extract first time synchronization information (NCR) of a current time and second time synchronization information (NCR) included in an overlapping signal and calculate a difference value between the two time synchronization information, when the overlapping signal which is an overlapped signal of a terminal station is received on the same channel as a channel of the transmission signal of the central station, and to extract the transmission signal of the central station stored in a previous time in the storage unit based on the difference value and remove an interference signal included in the overlapping signal. The first time synchronization information is received from the central station in a preset time interval. The second time synchronization information is time synchronization information which is inserted into the transmission signal of the central station transmitted to the satellite in order to accomplish a network synchronization between the central station and the terminal station. The signal processor extracts the transmission signal of the central station which is stored in the storage unit in the previous time as much as the calculated difference value from the current time, and performs a cross correlation with respect to the extracted transmission signal of the central station and the overlapping signal. The signal processor removes the transmission signal of the central station from the overlapping signal through the cross correlation and restores a signal of a reception station on the same channel as the transmission signal of the central station. The transmission signal of the central station is a signal transmitted to the satellite through a forward link based on a digital video broadcasting (DVB)-S2 method, and the overlapping signal is a signal received from the satellite through a reverse link using a time division multiple access (TDMA) based DVB-return channel via satellite (RCS) method.

In accordance with another aspect of the present disclosure, a method for an interference signal cancellation of a central station includes: receiving a transmission signal of the central station, transmitted from the central station to a satellite, from the central station and storing the received transmission signal; receiving an overlapping signal which is an overlapped signal of a terminal station on the same channel as a channel of the transmission signal of the central station; extracting first time synchronization information (NCR) of a current time and second time synchronization information (NCR) included in the overlapping signal, and calculating a difference value between the extracted two time synchronization information; and extracting the transmission signal of the central station which is stored in a previous time as much as the difference value and removing an interference signal included in the overlapping signal from the transmission signal of the central station. The method further includes receiving time synchronization information of a corresponding point of time from the central station in a preset time interval. The second time synchronization information is time synchronization information which is inserted into the transmission signal of the central station transmitted to the satellite in order to accomplish a network synchronization between the central station and the terminal station. Removing an interference signal includes performing a cross correlation with respect to the transmission signal of the central station in the previous time as much as the calculated difference value from the current time and the overlapping signal. Removing an interference signal includes removing the transmission signal of the central station from the overlapping signal through the cross correlation and restoring a signal of a reception station on the same channel as the transmission signal of the central station.

BRIEF DESCRIPTION OF THE DRAWINGS

The objects, features and advantages of the present disclosure will be more apparent from the following detailed description in conjunction with the accompanying drawings, in which.

DETAILED DESCRIPTION OF EXEMPLARY EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 1:
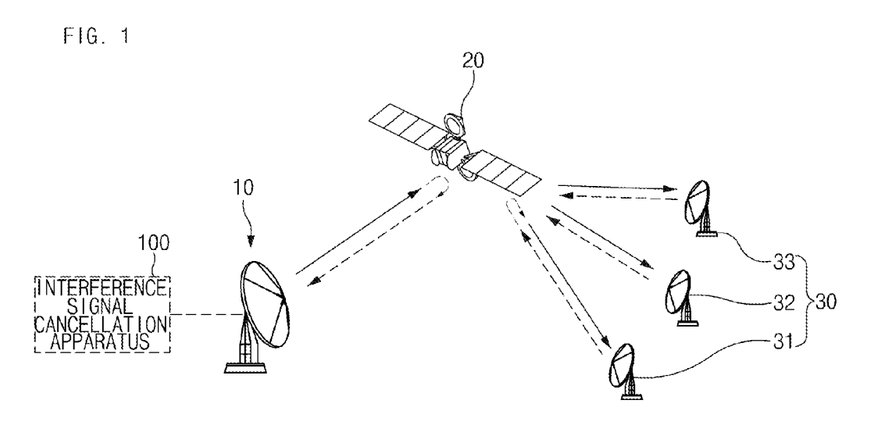
FIG. 1 is a diagram illustrating a configuration of a two-way satellite communication system applying an interference signal cancellation apparatus of a central station according to an embodiment of the present disclosure.

FIG. 1 is a diagram illustrating a configuration of a two-way satellite communication system applying an interference signal cancellation apparatus of a central station according to an embodiment of the present disclosure.

Referring to FIG. 1, the two-way satellite communication system according to an embodiment of the present disclosure may include a central station 10, a satellite 20, and a plurality of terminal stations 30.

The central station 10 may transmit a signal through a forward link of a Digital Video Broadcasting (DVB)-S2 method, and may receive a signal through a reverse link of a Time Division Multiple Access (TDMA) based Digital Video Broadcasting-Return Channel via Satellite (DVB-RCS) method.

Here, a frame of the DVB-S2 method may have a very long length in comparison with a packet of the TDMA-based DVB-RCS method, and the length of transmission data may be changed depending on a modulation scheme for transmission and a channel coding scheme.

Thus, in order to maintain a stable network synchronization with a plurality of terminal stations 30 by using a forward link and a reverse link, the central station 10 may insert a Network Clock Reference (NCR) value indicating a reference time of the central station 10 into a transmission frame of a forward link of a DVB-S2 method and transmit periodically to a plurality of terminal stations 30. Here, the NCR value may be transmitted after being inserted into a PCR field of MPEG standard.

An operation of inserting the NCR value which is transmitted to the terminal station 30 from the central station 10 into the transmission frame of a forward link of the DVB-S2 method is described in detail with reference to FIG. 2.

Figure 2:
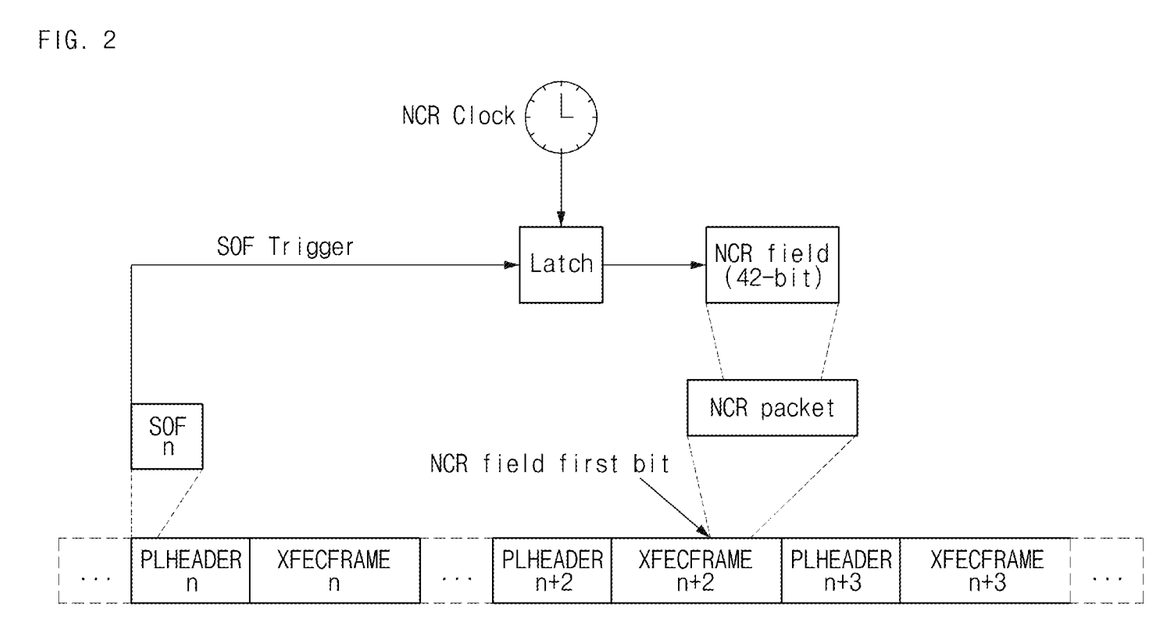
FIG. 2 is a diagram illustrating an embodiment referenced to describe an operation of inserting time synchronization information in a two-way satellite communication system according to an embodiment of the present disclosure.

As shown in FIG. 2, when inserting the NCR value into the transmission frame of a forward link of the DVB-S2 method, the central station 10 may insert a Start of Frame (SOF) signal into a first portion, for example, a header area ('PLHEADER') of the transmission frame of a forward link of the DVB-S2 method, in order to easily determine a point of time of generating a NCR packet including the NCR value by the central station 10 and a point of time of receiving the NCR packet including the NCR value by the reception side.

However, the SOF may occur in the state in which all input data configure a single DVB-S2 frame and a channel coding is complete. Thus, the central station 10 may insert the NCR packet including the NCR value into the next frame to the frame in the point of time of the occurrence of SOF.

For example, the central station 10 may insert the NCR packet including a 42 bit NCR value generated for the SOF of n-th frame into (n+2)-th frame to transmit to the terminal station 30. Obviously, the central station 10 may divide and insert the NCR packet including the NCR value into (n+2)-th and (n+3)-th frames and then transmit to the terminal station 30.

Therefore, the terminal station 30 may extract the NCR packet to which the NCR value is inserted from a signal received from the central stations 10 and may obtain the point of time of generating the NCR value by the central station 10. As described above, the terminal station 30 may maintain the time synchronization with the central station 10 by using the NCR value obtained from the signal received from the central station 10.

In addition, the terminal station 30 may transmit a signal to the central station 10 through the satellite 20. Here, a plurality terminal stations 30 may transmit a signal to the central station 10 through the satellite 20. Here, the signal of each terminal station 30 may have a smaller spectrum in comparison with the signal of the central station 10. Thus, the satellite 20 may transmit a signal of the terminal station 30 to the central station 10 by using the reverse link of the same channel as the signal channel of the central station 10.

Since the signal received by the central station 10 is transmitted through the reverse link of the same channel as the signal of the central station 10, the reception signal may be a signal (hereinafter referred to as "overlapping signal" and) overlapped with the signal of the central station 10.

Thus, the central station 10 may transmit the received overlapping signal to an interference signal cancellation apparatus 100 to request a signal restoration. The interference signal cancellation apparatus 100 of the central station 10 may compare the NCR value of the point of time of receiving the overlapping signal with the NCR value of the previous point of time included in the reception signal to calculate a difference between the two points of time, and may obtain the transmission signal of the central station 10 of the previous point of time through the calculated difference between the two points of time and may remove the transmission signal of the central station 10 from the overlapping signal.

A detailed configuration of the interference signal cancellation apparatus 100 is explained in more detail with reference to the embodiments of FIG. 3 and FIG. 4.

Figure 3:
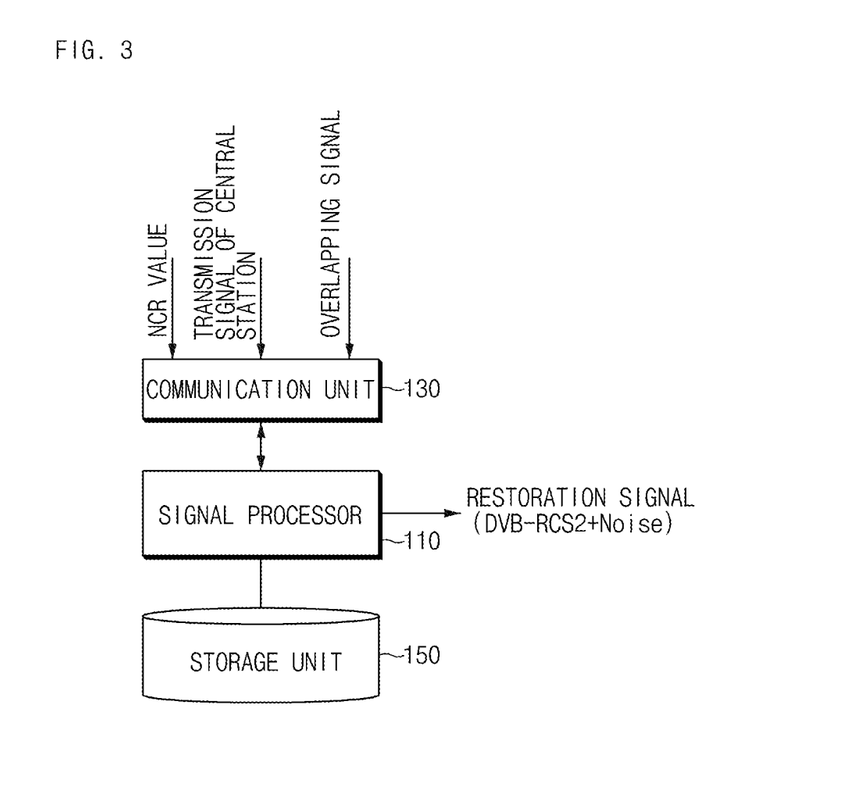
FIG. 3 and FIG. 4 are a diagram illustrating a configuration of an interference signal cancellation apparatus of a central station according to an embodiment of the present disclosure.

FIG. 3 is a diagram illustrating a configuration of an interference signal cancellation apparatus according to an embodiment of the present disclosure.

Referring to FIG. 3, the interference signal cancellation apparatus 100 according to the present disclosure may include a communication unit 130, a storage unit 150, and a signal processor 110.

The communication unit 130 may receive a signal from the central station, and serve to transmit a restoration signal of overlapping signal to the central station.

The communication unit 130 may receive a NCR value of a corresponding point of time from the central station in a preset time interval. The communication unit 130 may receive a transmission signal transmitted to the satellite from the central station. In this case, the storage unit 150 may store the NCR value received through the communication unit 130 and the transmission signal of the central station. Further, the communication unit 130 may receive an overlapping signal from the satellite.

Here, the communication unit 130 may include a module for an internet access by using a wireless internet technology, a module for a short-range communication, or a module for a wired communication.

The wireless internet technology may include Wireless LAN (WLAN), Wireless Broadband (Wibro), Wi-Fi, World Interoperability for Microwave Access (Wimax), High Speed Downlink Packet Access (HSDPA), and the like. The short-range communication technology may include Bluetooth, ZigBee, Ultra Wideband (UWB), Radio Frequency Identification (RFID), Infrared Data Association (IrDA), and the like. Further, the wired communication technology may include a Universal Serial Bus (USB) communication.

The storage unit 150 may store a data and a program required by the signal processor 110 to remove an interference signal.

As an example, the storage unit 150 may store an algorithm that calculates a difference of the NCR values, and store a setting value which removes the interference signal from the overlapping signal by using the difference of the NCR values, and which is required to demodulate and decode the overlapping signal and the transmission signal of the central station.

Here, the storage unit 150 may include a storage medium such as Random Access Memory (RAM), Static Random Access Memory (SRAM), Read-Only Memory (ROM), Programmable Read-Only Memory (PROM), Electrically Erasable Programmable Read Only Memory (EEPROM), and the like.

When the overlapping signal received by the central station is inputted from the communication unit 130, the signal processor 110 may determine the NCR value received periodically from the central station to extract the NCR value of the current time, and may demodulate and decode the overlapping signal and extract the NCR value inserted into the transmission signal of the central station to calculate a difference between two NCR values.

At this time, the signal processor 110 may obtain the transmission signal of the central station transmitted in a previous point of time by using a difference value between the calculated two NCR values, and may remove the transmission signal of the central station from the overlapping signal through a cross correlation for the obtained transmission signal of the central station and the overlapping signal.

Thus, the signal processor 110 may restore only the signal of a reception station to transmit to the central station.

Figure 4:
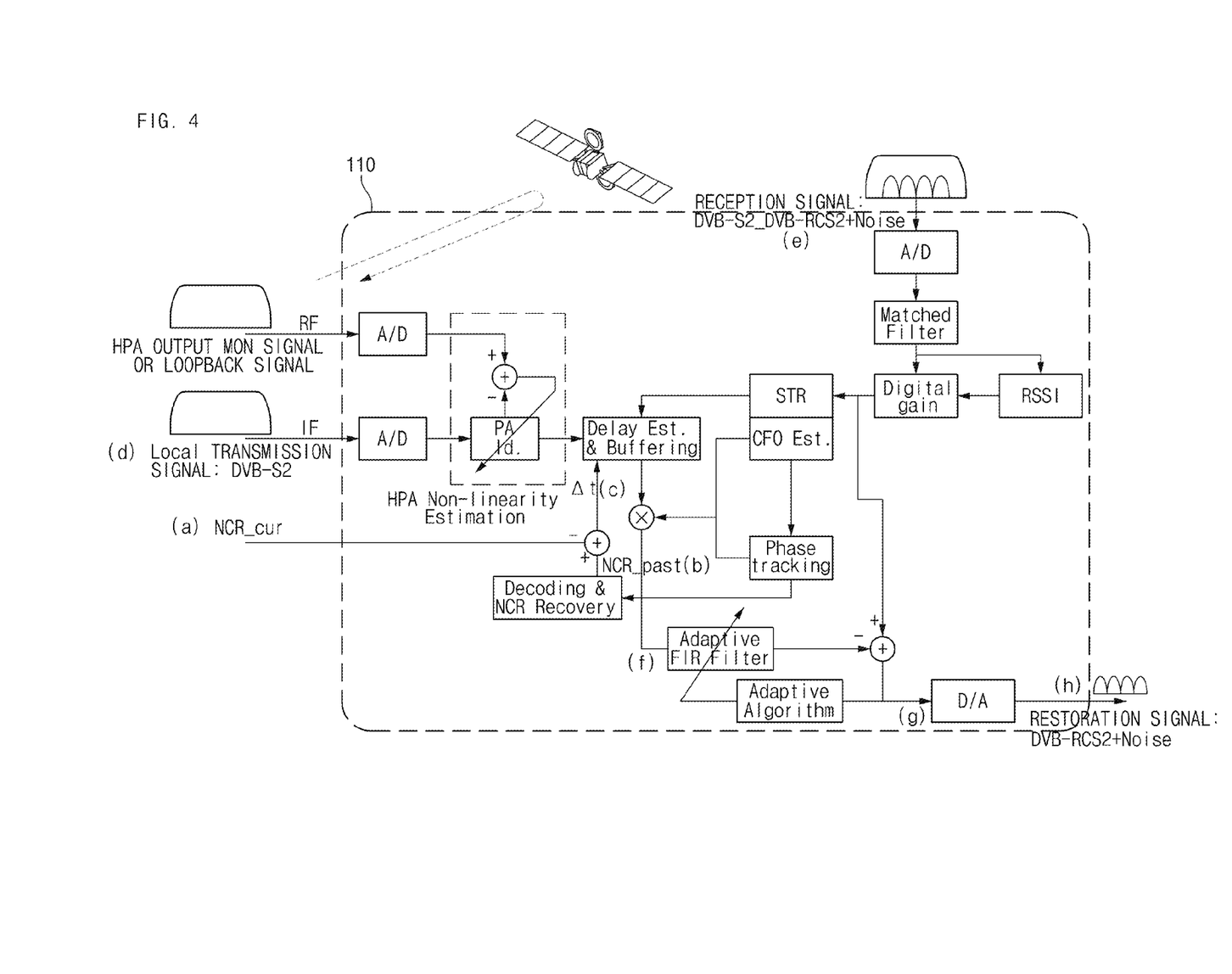

A detailed configuration for the signal processor 110 of the interference signal cancellation apparatus 100 may be indicated as shown in FIG. 4.

Referring to FIG. 4, the signal processor 110 may receive a signal (a) which is obtained by dividing the DVB-S2 scheme based transmission signal, which is transmitted from the central station to the satellite, in a IF band and a signal (b) received from the satellite in response to the transmission signal.

At this time, the signal processor 110 may estimate a non-linearity characteristic due to the central station or a High Power Amplifier (HPA) of the central station and the satellite through the signal (a) and the signal (b), and may store a signal (c) which is generated by adding the estimated non-linearity characteristic to the signal (a) in a buffer of the storage unit 150.

Then, the signal processor 110 may extract the current NCR ('NCR_cur') value (e) received from the central station, when the overlapping signal (d) is received.

In addition, the signal processor 110 may perform a demodulation process such as a symbol timing recovery (STR), a carrier frequency offset (CFO) estimation, a phase tracking, and the like with respect to the received overlapping signal (d), and may restore a NCR ('NCR_paxt') value (g) inserted into the overlapping signal from the demodulated signal (f). Here, the NCR value inserted into the overlapping signal may be a NCR value included in the transmission signal of the central station in the previous point of time.

Therefore, the signal processor 110 may calculate a difference value $\Delta t$ (h) between the current NCR value, i.e., the NCR_cur and the NCR value (g) restored from the overlapping signal, i.e., NCR_past, and may extract a signal transmitted from the central station before time $\Delta t$ from the current point of time from the buffer by using the calculated difference value $\Delta t$(h).

At this time, the signal processor 110 may generate a signal (i) similar to the transmission signal of the central station in the previous point of time, by applying information, e.g., a timing error, a frequency error, a phase error, and the like, of the demodulated signal to the extracted signal.

The signal processor 110 may remove the signal (i) from the overlapping signal by using an adaptive FIR filter, and may transmit a restoration signal (j) which removed the signal (i) to the central station.

In other words, the overlapping signal may include a transmission signal (DVB-SCR2) of the central station, a signal (DVB-S2) of the terminal station 30 and a noise. At this time, the signal processor 110 may generate a restoration signal including the signal (DVB-S2) of the terminal station 30 and the noise by removing the transmission signal (DVB-SCR2) of the central station from the overlapping signal.

The flow of the operation of the interference signal cancellation apparatus according to the present disclosure configured as described above is explained in more detail.

Figure 5:
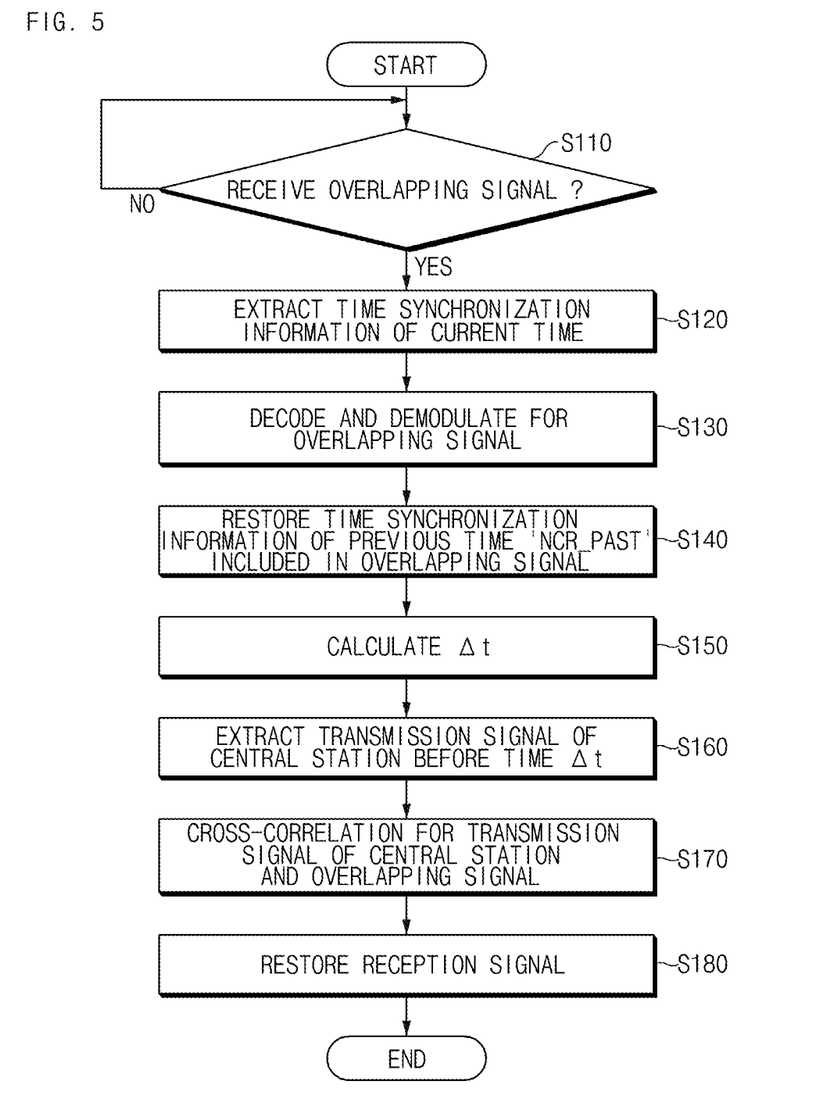
FIG. 5 is a flowchart illustrating an operation of a method for an interference signal cancellation of a central station according to an embodiment of the present disclosure.

FIG. 5 is a flowchart illustrating an operation of a method for an interference signal cancellation of a central station according to an embodiment of the present disclosure.

Referring to FIG. 5, when receiving the overlapping signal received from the central station (S110), the interference signal cancellation apparatus according to the present disclosure may extract time synchronization information 'NCR_cur' of the current time (S120). Here, since the interference signal cancellation apparatus receives time synchronization information from the central station in a preset time unit, it may extract the NCR value received from the central station in the point of time of receiving the overlapping signal as 'NCR_cur'.

In addition, the interference signal cancellation apparatus may perform a decoding and a demodulation for the overlapping signal received at step S110 (S130), and may restore the time synchronization information 'NCR_past' included in the decoded and demodulated overlapping signal (S140).

At this time, the interference signal cancellation apparatus may calculate the difference value Δt between the 'NCR_cur' extracted at step S120 and the 'NCR_past' extracted at step S140 (S150), and may extract the transmission signal of the central station stored in the buffer before the time Δt calculated at step S150 (S160).

The interference signal cancellation apparatus may perform a cross-correlation for the overlapping signal received at step S110 and the transmission signal of the central station extracted at step S160 (S170), and may restore a reception signal from the result (S180).

The signal restored at step S180 may be transmitted to the central station.

The interference signal cancellation apparatus according to the present embodiment that operates as described in the above may be implemented by an independent hardware device type, and the signal processor 110 of the interference signal cancellation apparatus may be implemented as a processor. On the other hand, the interference signal cancellation apparatus according to the present embodiment may be included in other hardware device such as a microprocessor or a general purpose computer system as at least one processor to be driven.

Figure 6:
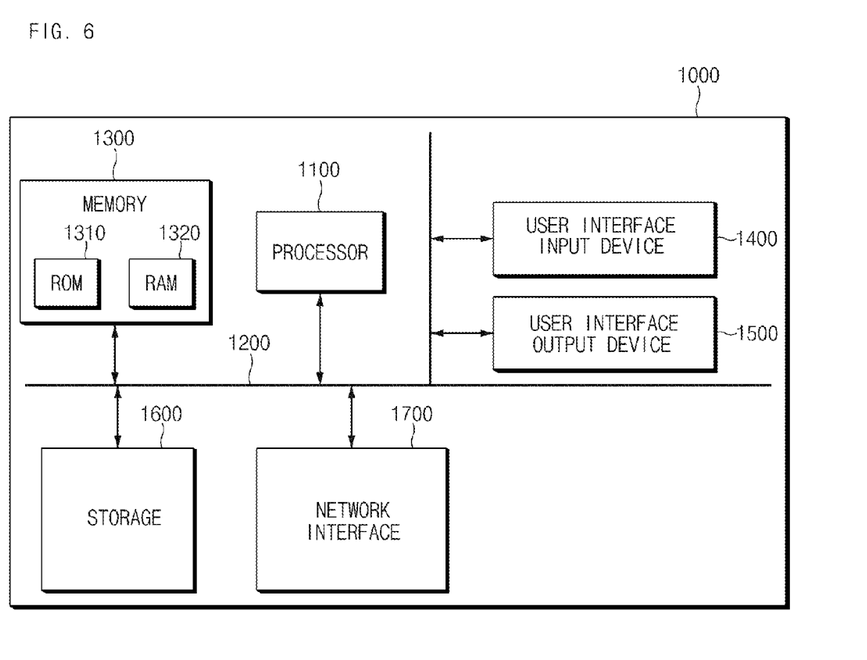
FIG. 6 is a block diagram illustrating a configuration of a computing system implementing an apparatus according to an embodiment of the present disclosure.

FIG. 6 is a block diagram illustrating a computing system implementing an apparatus according to an embodiment of the present disclosure.

Referring to FIG. 6, the computing system 1000 may include at least one processor 1100 which is connected via a bus 1200, memory 1300, an user interface input device 1400, an user interface output device 1500, a storage 1600, and a network interface 1700.

The processor 1100 may be a semiconductor device for performing a processing for instructions stored in a central processing unit (CPU) or the memory 1300 and/or the storage 1600. The memory 1300 and the storage 1600 may include various types of volatile and nonvolatile storage media. For example, the memory 1300 may include a Read Only Memory (ROM) 1310 and a Random Access Memory (RAM) 1320.

Thus, the steps of the method or the algorithm described in association with the embodiments disclosed herein may be directly implemented by a hardware, a software module, or a combination of the two executed by the processor 1100. The software module may reside in a storage medium (i.e., in the memory 1300 and/or the storage 1600) such as a RAM memory, a flash memory, a ROM memory, an EPROM memory, an EEPROM memory, a register, a hard disk, a removable disk, and CD-ROM. The exemplary storage medium may be coupled to the processor 1100, and the processor 1100 may read information from the storage medium and write information to the storage medium. Alternatively, the storage medium may be integrated in the processor 1100. The processor and the storage medium may reside in an application specific integrated circuit (ASIC). The ASIC may reside in a user terminal. Alternatively, the processor and the storage medium may reside in the user terminal as an individual component.

The present disclosure receives a overlapped signal via the same channel as a transmission signal when using a DVB-S2 method as a forward link and using a TDMA-based DVB-RCS method as a reverse link, and simply and quickly identify an initial synchronization point of time of the transmission signal through a Network Clock Reference (NCR) value inserted into a frame of signal to quickly remove the transmission signal from the overlapped signal.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims

What is claimed is:
1. An apparatus for an interference signal cancellation of a central station, the apparatus comprising:
   a communication unit configured to transmit and receive a signal to and from a central station;
   a storage unit configured to store a received transmission signal of the central station when a transmission signal of the central station transmitted from the central station to a satellite is received via the communication unit; and
   a signal processor configured to extract first time synchronization information (NCR) of a current time and second time synchronization information (NCR) included in an overlapping signal and calculate a difference value between the two time synchronization information, when the overlapping signal which is an overlapped signal of a terminal station is received on the same channel as a channel of the transmission signal of the central station, and to extract the transmission signal of the central station stored in a previous time in the storage unit based on the difference value and remove an interference signal included in the overlapping signal.

2. The apparatus of claim 1, wherein the first time synchronization information is received from the central station in a preset time interval.

3. The apparatus of claim 1, wherein the second time synchronization information is time synchronization information which is inserted into the transmission signal of the central station transmitted to the satellite in order to accomplish a network synchronization between the central station and the terminal station.

4. The apparatus of claim 1, wherein the signal processor extracts the transmission signal of the central station which is stored in the storage unit in the previous time as much as the calculated difference value from the current time, and performs a cross correlation with respect to the extracted transmission signal of the central station and the overlapping signal.

5. The apparatus of claim 4, wherein the signal processor removes the transmission signal of the central station from the overlapping signal through the cross correlation and restores a signal of a reception station on the same channel as the transmission signal of the central station.

6. The apparatus of claim 1, wherein the transmission signal of the central station is a signal transmitted to the satellite through a forward link based on a digital video broadcasting (DVB)-S2 method, and the overlapping signal is a signal received from the satellite through a reverse link using a time division multiple access (TDMA) based DVB-return channel via satellite (RCS) method.

7. A method for an interference signal cancellation of a central station, the method comprising:

receiving a transmission signal of the central station, transmitted from the central station to a satellite, from the central station and storing the received transmission signal;

receiving an overlapping signal which is an overlapped signal of a terminal station on the same channel as a channel of the transmission signal of the central station;

extracting first time synchronization information (NCR) of a current time and second time synchronization information (NCR) included in the overlapping signal, and calculating a difference value between the extracted two time synchronization information; and extracting the transmission signal of the central station which is stored in a previous time as much as the difference value and removing an interference signal included in the overlapping signal from the transmission signal of the central station.

8. The method of claim 7, further comprising receiving time synchronization information of a corresponding point of time from the central station in a preset time interval.

9. The method of claim 7, wherein the second time synchronization information is time synchronization information which is inserted into the transmission signal of the central station transmitted to the satellite in order to accomplish a network synchronization between the central station and the terminal station.

10. The method of claim 7, wherein removing an interference signal comprises performing a cross correlation with respect to the transmission signal of the central station in the previous time as much as the calculated difference value from the current time and the overlapping signal.

11. The method of claim 10, wherein removing an interference signal comprises removing the transmission signal of the central station from the overlapping signal through the cross correlation and restoring a signal of a reception station on the same channel as the transmission signal of the central station.

* * * * *